July 9, 1968 — C. B. KURTZ — 3,391,496
CENTERLESS SURFACE FINISHING
Filed Nov. 15, 1965 — 2 Sheets-Sheet 1
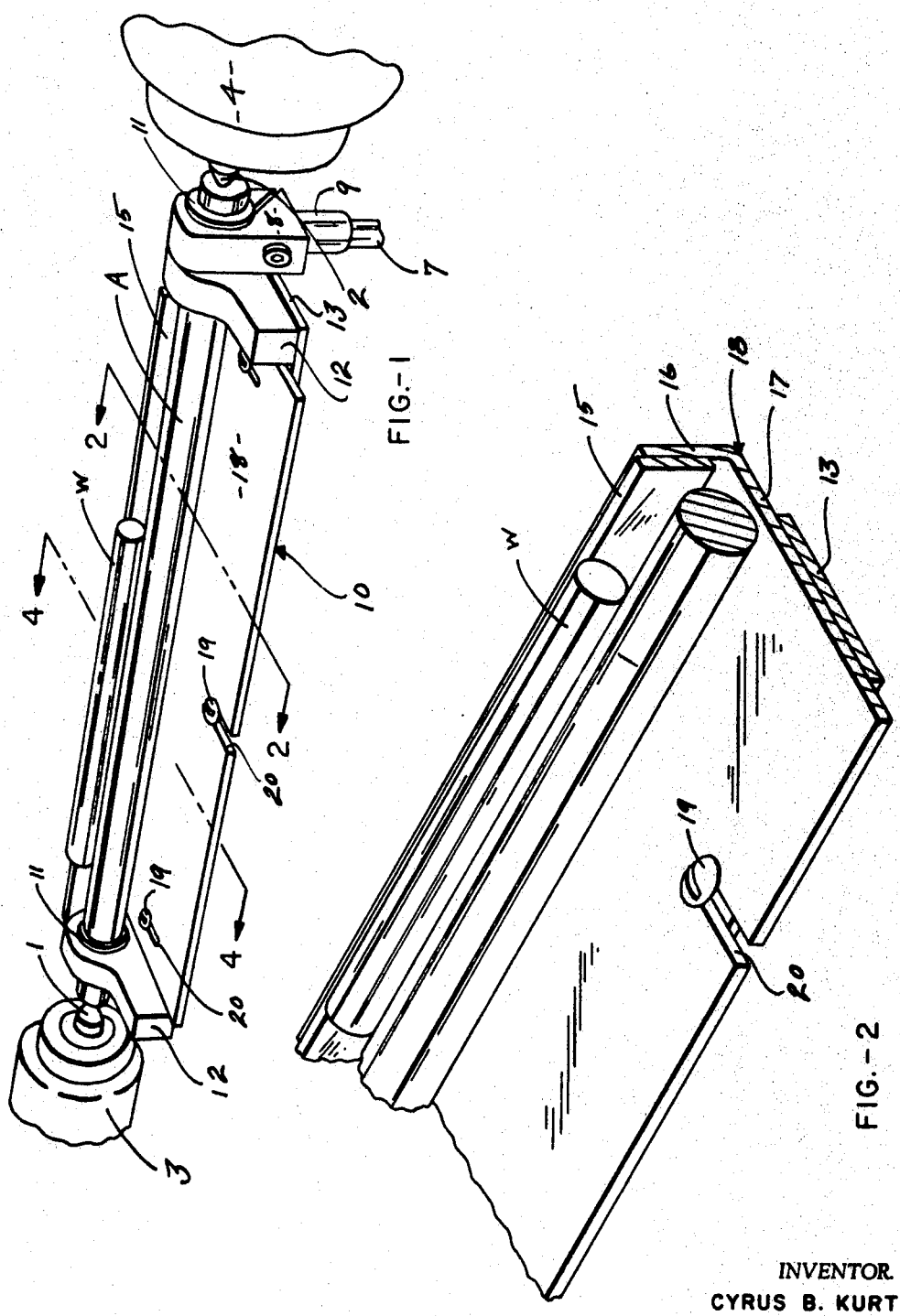
INVENTOR.
CYRUS B. KURTZ
BY
ATTORNEYS July 9, 1968  C. B. KURTZ  3,391,496
CENTERLESS SURFACE FINISHING
Filed Nov. 15, 1965  2 Sheets-Sheet 2

INVENTOR.
CYRUS B. KURTZ
BY
ATTORNEYS

United States Patent Office

3,391,496
Patented July 9, 1968

3,391,496
CENTERLESS SURFACE FINISHING
Cyrus B. Kurtz, 3372 Mayfield Road,
Cleveland, Ohio 44118
Filed Nov. 15, 1965, Ser. No. 507,786
2 Claims. (Cl. 51—135)

ABSTRACT OF THE DISCLOSURE

Apparatus for fine surface finishing of cylindrical metal workpieces using an abrasive belt moving tangentially of the workpiece and a centerless drive arrangement for turning the workpiece about its axis. The workpiece is supported along two parallel lines of contact by a rotating arbor having a fixed axis and a fixed blade having an upright surface which engages the workpiece tangentially. The work is normally rotated so that its upper surface moves in the same direction as the adjacent run of the belt but at a slower speed.

---

This invention relates to finely finishing the surfaces of revolution of hard and/or metallic bodies, and comprises, among other things, an improvement upon, or for use with, my prior invention disclosed in U.S. Patent No. 3,157,968, issued Nov. 24, 1964. In one aspect this invention comprises a fixture for, or attachment to, the finishing machine disclosed in my prior patent by virtue of which centerless support, and more rapid and convenient feed of the work to, and removal from, the locus of the finishing operation, is provided.

To illustrate and describe my invention it will be taken herein in its coaction with and relation to the method and machine of my prior patent as a preferred embodiment and environment, without, however, intending to limit its utility and advantage to that relation and environment alone.

It is an object of my invention to provide centerless support for rotation and longitudinal motion of a cylindrical workpiece while having its cylindrical surface, or a surface of revolution thereon, finished as by the method and machine of my prior patent.

Another object is to provide an inexpensive, simple, convenient, removable attachment for a machine like or similar to my prior patent to afford centerless support for the work with more rapid and convenient feed of the work to and from the finishing operation than is afforded by centered support of the work.

Another object is to improve the finishing operations done by, and extend the breadth of utility of, the method and machine of my prior patent. A more specific object is to achieve, and/or more quickly achieve, a more truly cylindrical form, as well as the smooth surface characteristics, of a cylindrical workpiece by the method and machine of my prior patent. Another object is to support work for surface finishing as by the method of my prior patent which work is otherwise incapable of accurate support or positioning.

These and other objects and advantages will more fully and at large appear from the following description of a preferred form of my invention, and preferred environment therefor, reference being had to the accompanying drawings in which:

FIGURE 1 is a perspective view of the attachment or fixture embodying my invention, with the workpiece in to-be-finished position, viewed as mounted on the machine of my prior patent and viewed from the side of the machine opposite the operator and opposite the finishing belt driving mechanism.

FIGURE 2 is a perspective like FIGURE 1 cut in section, however, in the plane of the line 2—2 of FIGURE 1.

Figure 3:
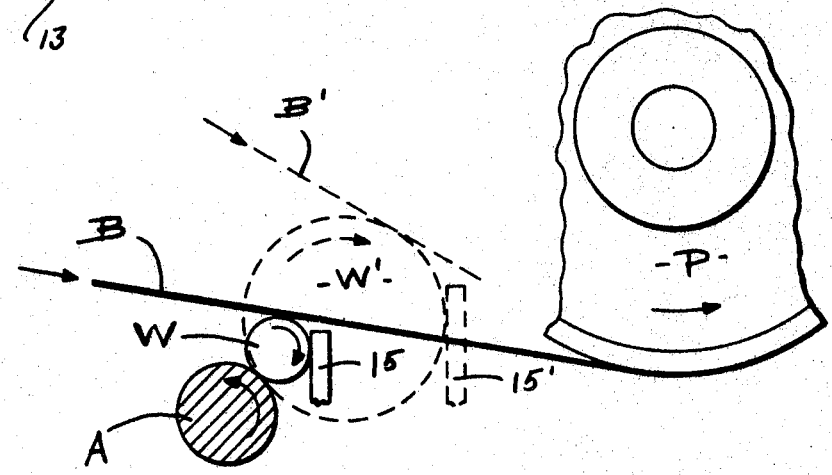
FIGURE 3 is a partly diagrammatic and fragmentary cross-section showing particularly the relation of the work to the centerless support therefor and to the abrasive finishing belt as viewed in the plane of the line 2—2 of FIGURE 1.

My prior patent, in the preferred environment of which my present invention has proved its utility, teaches the surface finishing method and machine wherein a cylindrical workpiece, such as the work W herein, is supported on live centers of a lathe like the live centers 1 and 2, FIGURE 1 herein, of a lathe suggested only by the fragments of the tail stock 3 and head stock 4, FIGURE 1, and rotated about a fixed, or intended to be fixed, axis and given a surface speed of about 50 to 200 feet per minute, preferably in the same general direction as the motion of the abrasive belt B, FIGURE 3, which moves at speeds of preferably from about 8,000 to 12,000 feet per minute. A fragment of the driving pulley P for the belt B will suggest the presence of the belt driving and positioning mechanism of my patent. Here in my present invention instead of supporting and rotating the work W on the live centers 1 and 2, I support my driving arbor A in the centers 1 and 2 and rotate the arbor A in substantially the same relation to the belt B, and the driving, supporting and guiding mechanism therefor, as is fully taught in my prior patent. As will more fully appear below, the work W rests upon and is rotated by surface contact with the arbor A so that the surface speed given to the arbor is also given to the work W.

Briefly summarized, my attachment as a whole, 10, FIGURE 1, may be inserted into and "attached" to the machine of my prior patent by, essentially, the mere substitution of the arbor A in the place and stead of the workpiece shown in my patent and between the same live centers and driven in the same way with only two exceptions: (1) the arbor A herein is rotated in the opposite direction to the workpiece of the patent to give the work W here the same direction of rotation as the workpiece of the patent, and (2) the attachment 10, except for the arbor, is held by the dog 9, FIGURE 1, against rotation with the arbor from which, as shown in FIGURE 1, it is carried by bearing bushings 11 in brackets 12 in which the arbor is journaled near its opposite ends. The dog 9 has a screw clamp 8 at its upper end through which it selectively grips the bushing 11 disposed therein, and thereby positions the attachment 10 as a whole in any desired angular position about the axis of the arbor and centers, as well as holding the attachment against rotation; the latter result being had by any convenient connection, contact or engagement between the depending leg 7 of the dog, not shown in full, with the bed or any adjacent fixed part of the lathe, not shown here, but shown in my prior patent.

The arbor A while shown as but a little longer than the attachment 10, may, for example, be twice, more or less, as long as the attachment to permit longitudinal motion of the attachment along the arbor. In such event the leg 7 would also have an adjustable, longitudinal engagement with the bed or fixed part of the lathe.

Now, more particularly, to the centerless support of the work W by the attachment 10 and the structure and operation of the attachment:

The brackets 12 comprise the end members of the frame or chassis of the attachment 10 which is completed by the stout, rectilinear bottom plate 13 rigidly secured to the brackets and extending longitudinally of the attachment and parallel with the arbor A and disposed and spaced generally below the arbor, see FIGURES 2 and 4 particularly. The brackets 12 like the clamp 8 releaseably grasp and contain the bushings 11, sharing the rightward bushing, as viewed in FIGURE 1, with the clamp 8 of the dog 9.

The business of the chassis 12–13 is to comprise and to support means for adjustably positioning and positively locating the work engaging blade 15 in whatever relation is sought for it in respect to the arbor A, both vertically and horizontally, as shown in the drawings, and/or inclined from the vertical to lie in the chord of any circle having its center in the axis of the arbor, as may be desired. The blade 15 is preferably made of stout, hardened, steel stock having a substantially truly planar, polished and hardened surface facing the arbor and smoothly and slideably engageable with the work on approximately a geometric line parallel with the axis of the arbor, and having a smooth opposite surface engaging the inner face of the vertical, as shown, leg 16 of the angled blade-carrier 18, FIGURES 1 and 2, whose horizontal leg 17 is adjustably, smoothly and slideably supported on the bottom plate 13. Clamp screws 19 having threaded engagement into the plate 13 and passing through elongated slots 20 in the leg 17 of the carrier in any desired horizontal relation to the arbor, i.e., near or far from the operator of the machine, i.e., toward the front or back of the machine from the operator's point of view. Similar clamp screws 21 passing through elongated slots 22 in leg 16 of the carrier and threaded into, but not through, the blade 15 facilitate the adjustable vertical positioning of the blade relative to the carrier and relative to the arbor and to the work. Clamp screws 21 in slots 22 also facilitate the preferred parallel relationship between the upper edge of the blade and the axis of the arbor.

Figure 4:
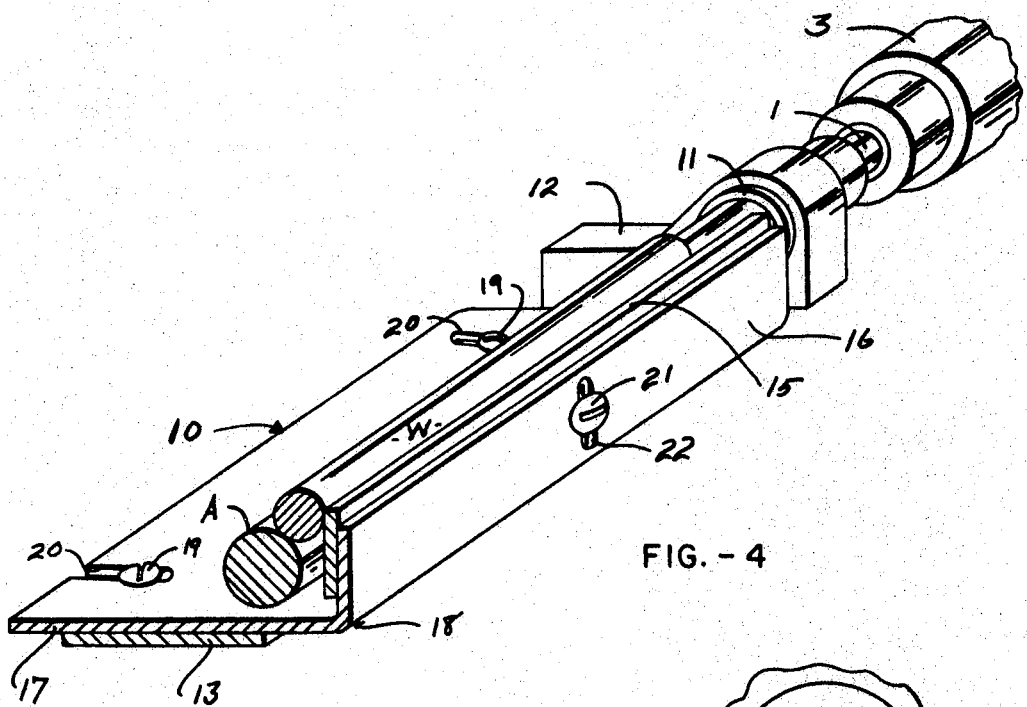
FIGURE 4 is a fragmentary perspective of my attachment with the work in situ but taken in section along the line 4—4 of FIGURE 1 from the operator's side of the machine of my prior patent, i.e., viewed oppositely of FIGURE 1.

Referring now more particularly to FIGURES 3 and 4, the work W is shown supported in rolling contact with the arbor A and in sliding contact with the blade 15 and in working, finishing engagement with the belt B. Gravity and the restrained downward and leftward, as viewed, viewed, pressure of the belt B upon the work hold it in frictional driving engagement with the arbor on a fixed-in-space line of contact parallel with the axis of the arbor as determined and selected by the position given the blade 15. Preferably this line of contact is between about one and two o'clock on the arbor, as viewed, i.e., between about 30° and 60° clockwise from the vertical toward the blade. For rule of thumb, the work, depending on its shape and mass, should contact the arbor far enough around to the right of top dead center, as viewed, to resist the tendency of the arbor to roll the work away from the blade at any time, before, during or after the work has working engagement with the belt. And, conversely, the work should be held up high enough on the upper right, as viewed, quadrant of the arbor to avoid deleterious and/or unnecessary jamming, like a flattened toggle, between the arbor and the blade with useless friction between the work and the blade. As shown and suggested in FIGURE 3, the upper edge of the blade preferably extends a small but appreciable distance higher than the line of contact between the work and the blade to assure a full contact therebetween, and this appreciable distance is preferably kept at a reasonable minimum so that the belt B will freely clear the top of the blade throughout as wide a range of angles of inclination of the belt from the horizontal as my prior patent teaches and as is suggested herein between the belt B and the broken-line-belt B'.

In broken or dashed lines in FIGURE 3 there is suggested a larger workpiece W' supported by the blade 15' for rolling and driving engagement with the arbor A and for working engagement with the abrasive belt B'. It has been found convenient to relate the size of the arbor to the work more or less within the range suggested in FIGURE 3, i.e., the work preferably being not much smaller than about ¼ the diameter of the arbor and not much larger than twice the diameter of the arbor. It will be appreciated too, that the arbor in its turn should have a relation of diameter to length, and/or high enough strength as a beam supported at its ends in bearing-bushings 11, to maintain a substantially straight axis and a full line contact throughout the length of the work, depending again, as those skilled in the art will understand, upon the length and mass of the workpiece.

The things in FIGURE 3 shown in dashed or broken lines not only illustrate a relatively large workpiece but also suggests that the line of contact between the work W' and the arbor is at or nearing the two o'clock limit of my preferred angle of contact therebetween unless the work is, for example, a hollow tubular piece of small mass in relation to its external diameter. Should the work W' be solid and heavy it would be my present preference to swing the whole attachment 10 counterclockwise, as viewed in FIGURE 3, about the axis of the arbor, thereby rolling the line of contact between the work W' and the arbor counterclockwise from about the two o'clock position as shown to about one o'clock, not shown. Such swinging of the attachment would swing the blade 15' bodily about the axis of the arbor, raising and inclining the blade upwardly and leftwardly as viewed, and probably requiring a repositioning of the belt-driving pulley P and belt B' to establish the working relation between the belt and the work as taught in my prior patent, and to clear the upper edge of the swung blade as taught herein. Such swinging of the attachment as a whole is readily accomplished by swinging the leg 7 of the dog 9 counterclockwise as viewed in FIGURE 1 from a middle anchored position suggested in FIGURE 1 to an anchorage nearer the operator and nearer the front of the bed of the lathe. Alternatively, the screw clamp 8 of the dog 9 may be released whilst the attachment with the brackets 12 and bushings 11 are swung to the desired angular position, then the screw clamp 8 reengaged with the next bushing 11 to secure the attachment in its new desired position.

Referring now to FIGURES 1 and 4 it is within my teaching that the portion of the arbor A between the bearings 11 may be advantageously chosen with increased diameter to stand higher than the brackets 12; the blade 15 being raised also if the size of the work requires it, so that the work may be fed longitudinally more freely to and from the attachment, and in substantially the line of its working position "on" the arbor and blade, without interference from the barckets.

Employing the teaching of my prior patent the abrasive finishing belt B may be given a desirable variety of angular relations to the horizontal, FIG. 3, for example, and the whole loop of the belt and its driving and supporting pulleys etc. may be moved bodily rightwardly and leftwardly as viewed in FIG. 3 to and from contact with the work, lightly or more forcibly as taught in my patent, and, of particular interest herein, the belt may also be swung with its lower strand moving in a plane tangent to the work, or parallel with such tangent plane, so that its path of travel may be inclined rightwardly and leftwardly from the operator's point of view, i.e., from a position inclined toward the tailstock, through a plane normal to the axis of the work, and then toward the headstock. As described in my prior patent these different angular paths given to the abrasive particles in a plane tangent to the work facilitate the abrasive removal of the microscopic ridges and cross-ridges of the microscopically rough surface of the work.

Now, here, in my present invention this inclination of the belt with respect to a plane normal to the axis of the work may perform the additional service of urging the work to move longitudinally of the blade and arbor, and aid in effecting a longitudinal feed, of the work, depending, of course, on the relation of the mass of the work to the desired depth of the "cut" of the abrasive particles and otherwise within the realm of prudence taught in my patent.

One of the advantages of my centerless fixture and finishing is that work, which has physical form incompatible with being finished by my prior patented machine and/or being chucked or supported at its ends, such as a piece ⅛ inch in diameter and 3 feet long, is readily finished with my present invention, even assuming my arbor and attachment to be no more than a foot long, by continuous longitudinal feed in the axis of the portion of the work being worked by the belt. For such light flexible work, aiding the feed by inclining the belt as aforesaid is helpful.

My centerless support of the work has remarkable advantage in solving the problem of making the workpieces more truly circular cylindrical. That is to say: in modern parlance about fine work, 50 to 100 millionths of an inch out of round is called "out-of-round," while deviation from roundness less than 25 millionths of an inch goes for "round" or "truly round." My centerless finishing and support reduces the problem of making roundness in fine workpieces, getting roundness down to within a few millionths of an inch with greater facility than prior practice could approach much greater deviations such as 25 millionths aforesaid.

I have obtained this advantage consistently, and I believe the best way of doing it and the reasons why it works are these: As shown best in FIG. 3 the work is supported against gravity and other downwardly acting forces, if any, only on the parallel lines of contact with the arbor and the blade respectively, i.e., upon, or as if upon, downwardly converging planes each tangent to the work at its line of contact, and thus supported as in the V groove of a sensitive machine for measuring roundness. The belt B moving tangent to the work opposite the arbor and blade will make a third line, and only a line of contact with the work throughout a whole revolution of the work when, and only when, the surface of the work is truly circular, i.e., round or right, circular cylindrical, because three points determine one true circle. Therefore by addressing the belt to the work as in FIG. 3, with the belt taut and substantially planar, and the work being out of round, the belt will have but one line of contact at one angular place on the "high spot" of the work each revolution of the work so long as the belt is not pressed toward the work to be deflected from a straight planar path past, and just touching the work at the high spot, i.e., the sole line of contact. It follows that if the belt be pressed toward the work enough to be deflected and contact more than one line per revolution, say 5° of arc adjacent the first contactable line, the deflected belt will then, by substantially tangential, abrasive removal of stock, even microscopically, as described in my prior patent, reduce the 5° arc and area of contact with the belt deflected to a single line contact throughout about the same arc with the belt restored to its straight planar tangency to that much arc of the work. It follows that if the belt were again pressed toward the work and again deflected to have arcuate rather than line contact it will when driven and charged as taught in my patent, or in this example with a coarser charge and harder surface for reducing more than just microscopic ridges, again reduce the radius of the "high" area of the second and larger arc to a circular arc of a true circle which includes the lines of contact with the arbor and the blade but fails to coincide with the balance of the surface of the work. It remains, therefore, to again press the belt toward the work and again deflect the belt from its planar path and again have still greater arcuate contact with the work including and extending circumferentially beyond the last formed circular arc of too-great radius, and again "hogging" down (microscopically) the high area including the preceding circular part thereof until successively the last resulting circular arc achieves 360° of arcuate length and circular perfection. Then if, meanwhile, while this stock-removing work has been progressing, and nearing fruition, the coarseness of the abrasive particles and hardness of the belt has been progressively reduced, as taught in my prior patent to achieve microscopic surface smoothness, and the belt has been swung rightwardly and leftwardly and directed to tangency with, intersecting helical, as well as circular, lines on the surface of the work, then both true circular roundness and true surface smoothness, within a fraction of a millionth of an inch, i.e., a fraction of a microinch, as may be desired, and as nearly as practicable to measure, may be achieved substantially simultaneously.

The expression of "hogging" the work, even microscopically, is intended to suggest in the terms of my prior patent that some sparkling between the belt and the work may be indulged in for the relatively brutal task of removing stock below the bottoms of the microscopic valleys of surface roughness to gain roundness as above described, and let smoothness wait until, preferably, substantial but not quite complete roundness had been achieved.

My centerless method of gaining roundness excells, surprisingly, prior efforts of mine and others because, as I now believe, when the work is supported on centers or chucked as in my prior patent, everything else being the same, all the errors inherent in the machine apart from the work are introduced and can't be eliminated, whereas my centerless method and fixture eliminates all elements and chances effecting out-of-roundness except that centained in the work itself, and when that is removed nothing remains to obscure or deflect the result desired. When roundness is sought to be gained by centerless grinding, the inflexibility of abrasive wheels denies the operation and results of my flexible, tangentially moving belt in the very premises.

While this specification has assumed that the work would have a hard and/or metallic surface, I have used my present invention to treat work as soft as aluminum advantageously taking precaution however to keep the arbor and blade very clean and smooth throughout the finishing operation and/or preferably wrapping the arbor thinly with light masking tape or the like, and applying a thin plastic film such as "Scotch" tape to the face of the blade engaging the work, all this precaution because the relatively soft aluminum surface is easily and noticeably defaced upon light rolling or sliding contact with dirt, stray abrasive and abrasively removed particles.

While I have illustrated and described my invention primarily as a fixture or attachment substitutable for the workpiece in the lathe part of the mechanism of my prior patent, it is within my teaching to set up the attachment 10 on about any bench, table or machine whereon and/or wherein the work may be properly related to the abrasive belt and belt-driving mechanism of my prior patent or the equivalent thereof, and wherein the arbor may be located and rotated, and the blade positioned, as herein above described. While this specification is essentially concerned with a preferred form of my invention changes and improvements will occur to those skilled in the art who use and understand the same wherefore I do not want to be limited to the form or forms herein specifically disclosed nor in any manner inconsistent with the progress in the art which my invention has promoted.

I claim:

1. The combination of a rotatable arbor having a fixed axis, a fixed upright blade having an upright surface disposed adjacent the arbor on the front side thereof and parallel therewith, and an endless abrasively charged flexible belt running having a flat run above and extending from behind to the front of the arbor, the arbor and blade being adapted to support between them a cylindrical workpiece on spaced parallel lines of contact, and said belt run being adapted to contact said workpiece tangentially on a third line of contact spaced from and defining a cylinder with respect to said first named lines of contact.

2. For centerless surface finishing of a cylindrical workpiece, a rotatable arbor having a fixed, generally horizontal axis and a smooth cylindrical surface, a fixed blade having a generally upright smooth planar surface positioned parallel and adjacent to the surface of the arbor for supporting the workpiece in rolling contact with the upper quadrant of said arbor adjacent said blade on one line of contact and also tangentially in sliding contact with said upright surface of said blade on a second line of contact, and an endless finishing belt having a flat run above said arbor and having essentially tangential contact with the work on substantially a third line of contact spaced from and defining a cylinder with respect to said first and second lines of contact.

References Cited

UNITED STATES PATENTS

| | | | |
|---|---|---|---|
| 432,144 | 7/1890 | Muncaster. | |
| 975,088 | 11/1910 | Thompson | 51—139 |
| 3,094,817 | 6/1963 | Bartholmew | 51—103 |
| 3,157,968 | 11/1964 | Kurtz | 51—145 |
| 3,266,197 | 8/1966 | Olton | 51—137 |
| 3,316,679 | 5/1967 | Wilson | 51—137 |

ROBERT C. RIORDON, *Primary Examiner.*

D. G. KELLY, *Assistant Examiner.*